(12) United States Patent
Ford

(10) Patent No.: US 12,441,222 B2
(45) Date of Patent: Oct. 14, 2025

(54) FLOOR MAT AND FIXING APPARATUS

(71) Applicant: Ford Global Technologies, LLC, Dearborn, MI (US)

(72) Inventor: Oscar Ford, Heybridge Basin (GB)

(73) Assignee: Ford Global Technologies, LLC, Dearborn, MI (US)

( * ) Notice: Subject to any disclaimer, the term of this patent is extended or adjusted under 35 U.S.C. 154(b) by 391 days.

(21) Appl. No.: 18/082,881

(22) Filed: Dec. 16, 2022

(65) Prior Publication Data

US 2024/0198883 A1 Jun. 20, 2024

(51) Int. Cl.
*B60N 2/06* (2006.01)
*B60N 3/04* (2006.01)

(52) U.S. Cl.
CPC ............... *B60N 3/046* (2013.01); *B60N 2/06* (2013.01)

(58) Field of Classification Search
CPC . B60N 2/06; B60N 2/07; B60N 2/025; B60N 3/04; B60N 3/044; B60N 3/046
USPC ..................................................... 296/97.23
See application file for complete search history.

(56) References Cited

U.S. PATENT DOCUMENTS

| | | | | |
|---|---|---|---|---|
| 10,245,991 B1* | 4/2019 | Salter | ........................ | B60Q 3/51 |
| 10,315,549 B2* | 6/2019 | Fiedler | .................... | F16B 27/00 |
| 2004/0062905 A1* | 4/2004 | Sehmer | .................... | G09F 19/22 |
| | | | | 428/137 |
| 2010/0272944 A1* | 10/2010 | Engelhardt | ............. | A47L 23/22 |
| | | | | 428/68 |
| 2011/0185537 A1* | 8/2011 | Winters | .................... | B60N 3/04 |
| | | | | 16/4 |
| 2011/0226901 A1* | 9/2011 | Gonnsen | ............ | A47G 27/0437 |
| | | | | 156/247 |
| 2012/0291227 A1* | 11/2012 | Fiedler | ..................... | A42B 3/22 |
| | | | | 24/700 |
| 2016/0101717 A1* | 4/2016 | Takenaka | ............... | B60N 3/044 |
| | | | | 16/8 |
| 2018/0229637 A1* | 8/2018 | Parra Becerra | ........ | B60N 3/048 |
| 2023/0045537 A1* | 2/2023 | Vogler | .................... | B60N 3/044 |
| 2023/0398919 A1* | 12/2023 | Morlet Ugalde | ...... | B60N 3/046 |
| 2024/0157864 A1* | 5/2024 | Kwon | ..................... | B60N 3/046 |
| 2024/0198883 A1* | 6/2024 | Ford | ..................... | B60N 3/042 |

FOREIGN PATENT DOCUMENTS

| JP | 3656614 B2 | 3/2005 |
|---|---|---|
| JP | 2005067227 A | 3/2005 |
| JP | 6016251 B2 | 10/2016 |

* cited by examiner

*Primary Examiner* — Gregory A Blankenship
(74) *Attorney, Agent, or Firm* — Haley Guiliano LLP

(57) ABSTRACT

A floor mat system is provided. The floor mat system comprises a floor mat comprising at least one attachment portion, a seat rail comprising a track, and a fastener configured to removably secure the attachment portion of the floor mat to the track. An apparatus is provided for securing a floor mat to a seat rail. The apparatus comprises a top plate that overlies a portion of the floor mat, a retaining portion configured to removably secure the apparatus to the seat rail and a connecting portion that connects the top plate to the retaining portion.

17 Claims, 10 Drawing Sheets

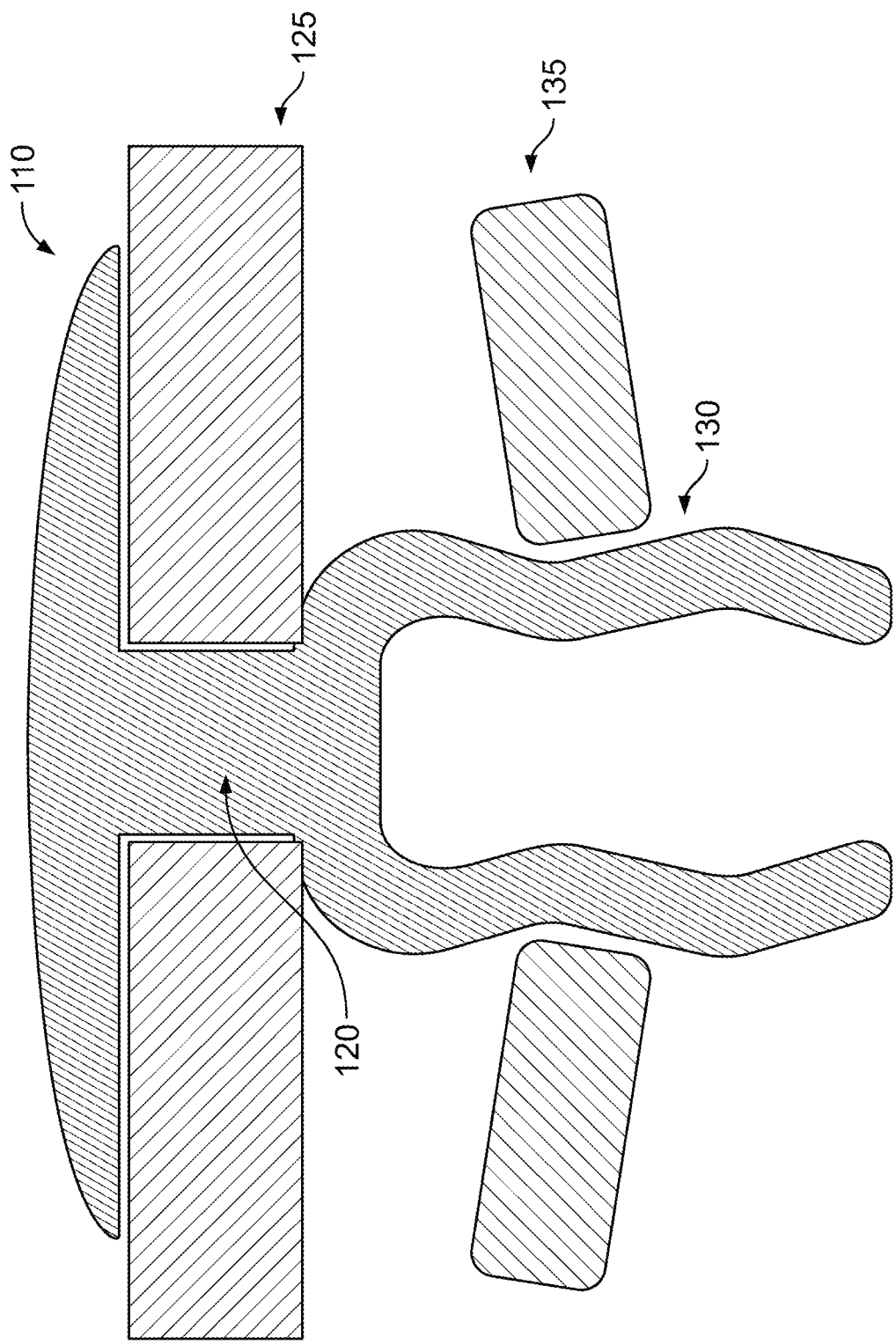

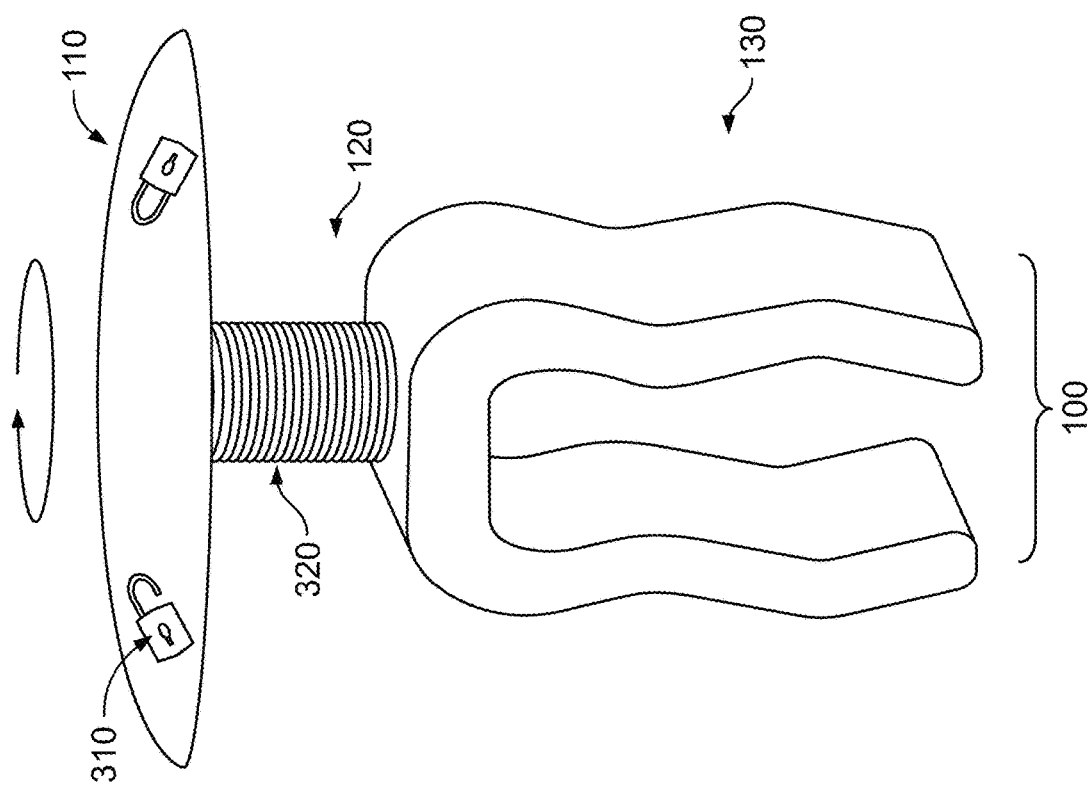

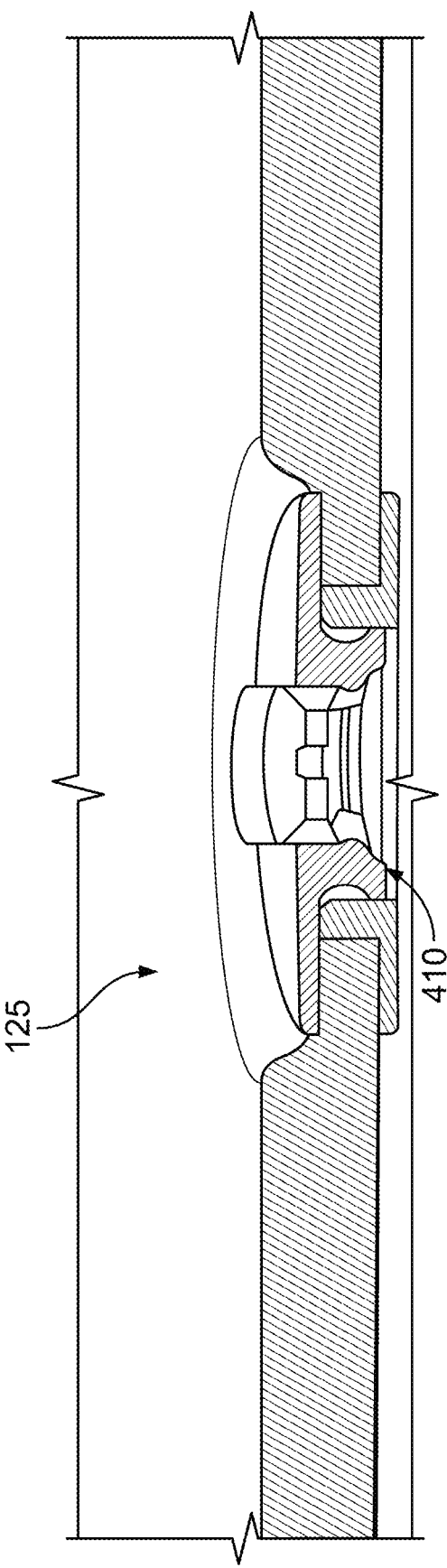

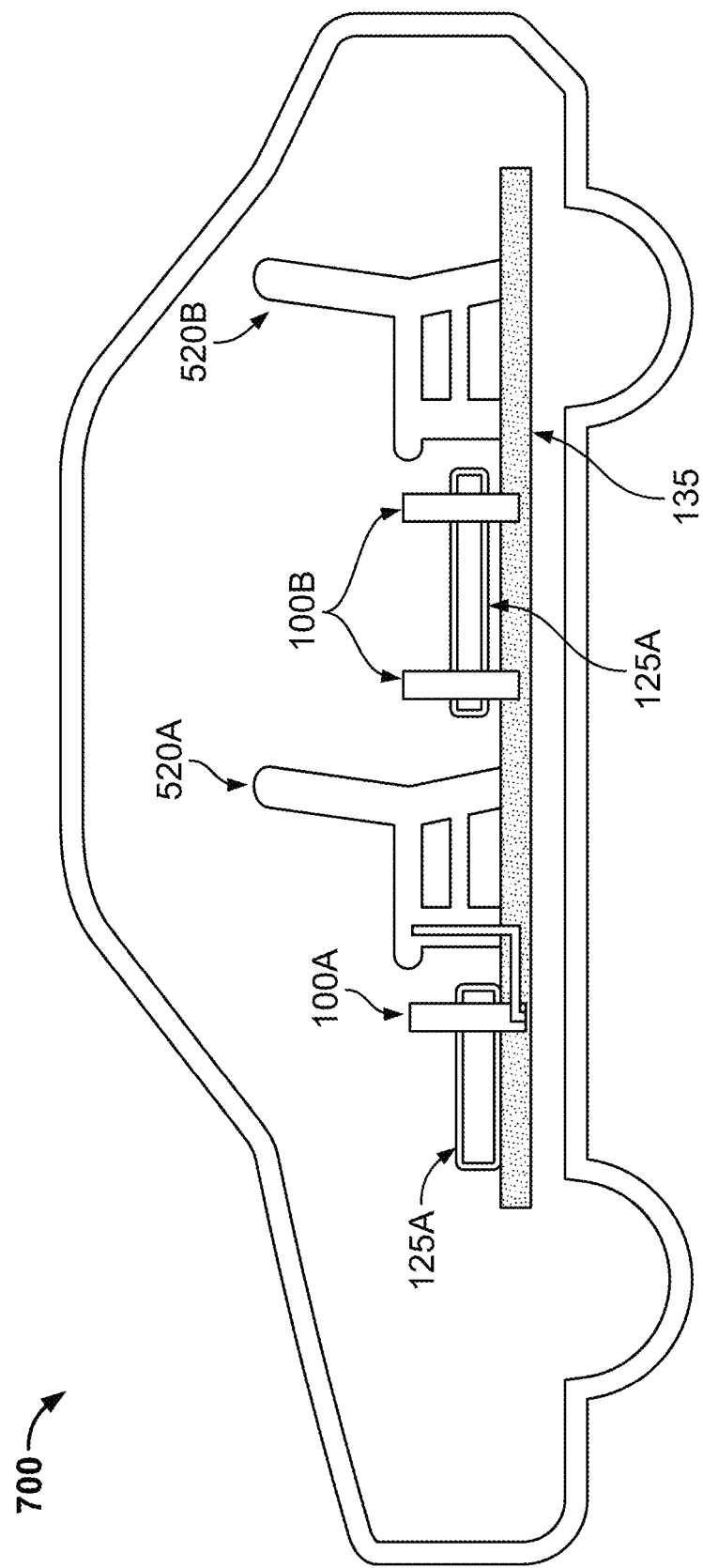

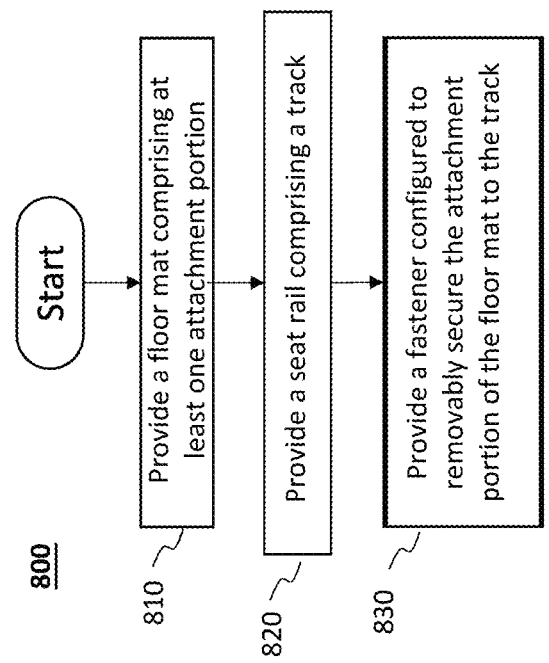

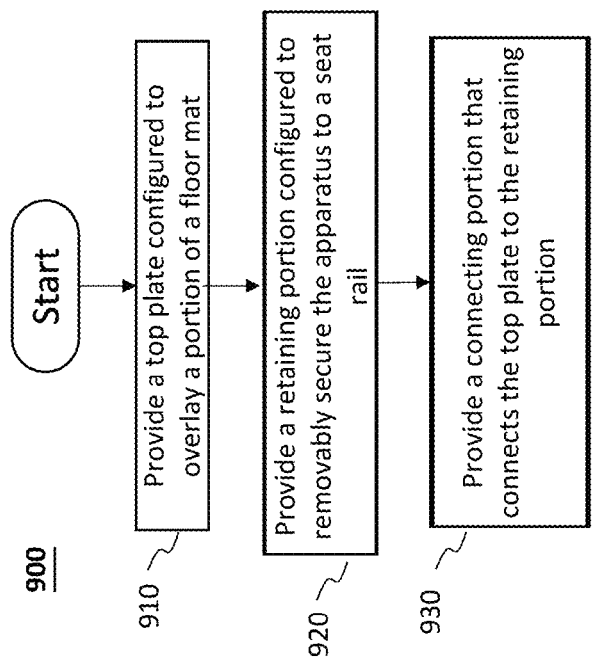

FLOOR MAT AND FIXING APPARATUS

FIELD OF INVENTION

The present disclosure relates to floor mats for vehicles, more particularly, but not exclusively, to systems and apparatus for securing a floor mat to a seat rail.

BACKGROUND

It is often desirable to place a floor mat on top of the carpet within a vehicle in order to keep the vehicle carpet clean and to reduce wear and tear thereof. Floor mats may be subjected to forces from the entrance and exit of vehicle occupants which can cause unsecured floor mats to move. Floor mat motion should be avoided in the driver's position as it may lead to pedal interference affecting control of the vehicle. Unsecured floor mats may also interfere with the adjustment of seats in vehicles with reconfigurable seating arrangements.

Various ways of securing floor mats to vehicle carpeting to prevent slippage thereon are known. For example, U.S. Pat. App. No. 20110185537A1 discloses a bracket for fixing a mat to an end of the seat track of a seat such that the mat moves as the seat moves. However, the bracket is not coupled to, and movable along, the seat rail or the track itself. In addition, JP Pat. No. JP3656614B2 discloses a seat rail end cap attachable to a seat rail end bracket, wherein the mat cannot be moved along the rail. Lastly, JP Pat. App. No. JP2016097874A discloses a mat slidably coupled to a seat leg and fixed to one of the floor or an adjacent seat. However, the mat is configured to fold on itself as the seat moves to prevent the mat from becoming jammed in the seat rail. The mat does not travel along the rail, e.g., as the seat moves.

Where vehicles have reconfigurable seating arrangements, the amount and the shape of the floor space varies between seating configurations. For example, where a vehicle has 2nd and 3rd-row seating, the floor space/shape in front of the 3rd row will be different when the 2nd-row seats are in a forward-facing configuration versus a rear-facing configuration. As a result, it is difficult to provide floor mats suitable for both configurations, since the floor mats typically attach to fixed anchor points on the floor of the vehicle.

SUMMARY

In view of the above discussion, a system and apparatus for securing floor mats to vehicle carpets are provided. Instead of attaching the mats to the fixed anchor points provided in current vehicle systems, it is proposed to removably attach the mats to seat rails, already provided in the vehicle to support the seats of the vehicle. In this way, the mats can be repositioned along the seat rails, depending on the position and orientation of the seats.

According to a first example of the present disclosure, there is provided a floor mat system comprising: a floor mat comprising at least one attachment portion; a seat rail comprising a track; and a fastener configured to removably secure the attachment portion of the floor mat to the track.

In some examples, the attachment portion comprises an aperture configured to receive the fastener. In some examples, the fastener is integral to the floor mat.

In some examples, the fastener is slidable along the seat rail while in a first position. In some examples, the fastener is fixed in a current position while in a second position. In some examples, the fastener is removable while in a third position.

In some examples, the system further comprises a second fastener for fastening the floor mat to a seat. In some examples, the seat is also secured to the seat rail. In some examples, the floor mat and the seat move synchronously.

According to a second example of the present disclosure, there is provided an apparatus for securing a floor mat to a seat rail. The apparatus comprises a top plate that overlies a portion of the floor mat; a retaining portion configured to removably secure the apparatus to the seat rail; and a connecting portion that connects the top plate to the retaining portion.

In some examples, the retaining portion can move freely within the seat rail when the top plate is in a first position. In some examples, the retaining portion is secured in a current position when the top plate is in a second position. In some examples, the retaining portion is removable from the seat rail when the top plate is in a third position.

In some examples, a rotation of the top plate is transferred to the retaining portion via the connecting portion. In some examples, the top plate and retaining portion are configured to sandwich, or abut, parallel surfaces of the floor mat.

In some examples, the connecting portion extends through an aperture of the floor mat.

In some examples, the top plate comprises instructional indicia that correspond to a positional function of top plate.

According to a third example of the present disclosure, there is provided a vehicle comprising a floor mat system, the floor mat system comprising: a floor mat comprising at least one attachment portion; a seat rail comprising a track; and a fastener configured to removably secure the attachment portion of the floor mat to the track.

According to a fourth example of the present disclosure, a method of assembly of a floor mat system. The method comprises: providing a floor mat comprising at least one attachment portion; providing a seat rail comprising a track; and providing a fastener configured to removably secure the attachment portion of the floor mat to the track.

According to a fifth example of the present disclosure, a method of manufacture of an apparatus is provided. The method comprises: providing a top plate configured to overlay a portion of a floor mat; providing a retaining portion configured to removably secure the apparatus to a seat rail; and providing a connecting portion that connects the top plate to the retaining portion.

Accordingly, it will be clear to the skilled person in the art that the present disclosure provides greater flexibility in the arrangement of floormats in a vehicle, in particular, in vehicles with a plurality of seating arrangements. In addition, the floor mat system can be moved in conjunction with the seat of the vehicle, on the seat rails, therefore, the likelihood of the floor mats moving, or jamming on the seat, for example, is minimized. Moreover, such a system removes the need to provide floor mat fixings during the assembly of the vehicle, reducing the complexity of plant processes, and further reducing the expense of manufacture.

Whilst the benefits of the systems and method may be described by reference to vehicles such as cars, it is understood that the benefits of the present disclosure are not limited to such types of vehicles, and may also apply to other types of vehicles, such as forklifts, trucks, buses, locomotives, motorcycles, aircraft and watercraft, and/or non-vehicle based systems that comprise floormats and seats, such as office cubicles and public seating areas, for example.

These examples and other aspects of the disclosure will be apparent and elucidated with reference to the example(s) described hereinafter. It should also be appreciated that particular combinations of the various examples and features described above and below are often illustrative and any other possible combination of such examples and features is also intended, notwithstanding those combinations that are intended as mutually exclusive.

BRIEF DESCRIPTION OF THE DRAWINGS

The above and other objects and advantages of the disclosures herein will be apparent upon consideration of the following detailed description, taken in conjunction with the accompanying drawings, in which:

FIG. 1 illustrates an apparatus for securing a floor mat to a seat rail, in accordance with at least one of the examples described herein;

FIGS. 3A to 3C illustrate various positions of the apparatus for securing a floor mat to a seat rail, in accordance with at least one of the examples described herein;

FIG. 4 illustrates an apparatus for securing a floor mat to a seat rail, wherein the apparatus is integral to the floor mat, in accordance with at least one of the examples described herein;

FIG. 7 illustrates a side view of a vehicle comprising a seat and floor mat arrangement, in accordance with at least one of the examples described herein;

FIG. 8 illustrates an example flow chart of a method of assembly of a floor mat system, in accordance with at least one of the examples described herein; and FIG. 9 illustrates an example flow chart of a method of manufacture of an apparatus, in accordance with at least one of the examples described herein.

DETAILED DESCRIPTION

Figure 2B:
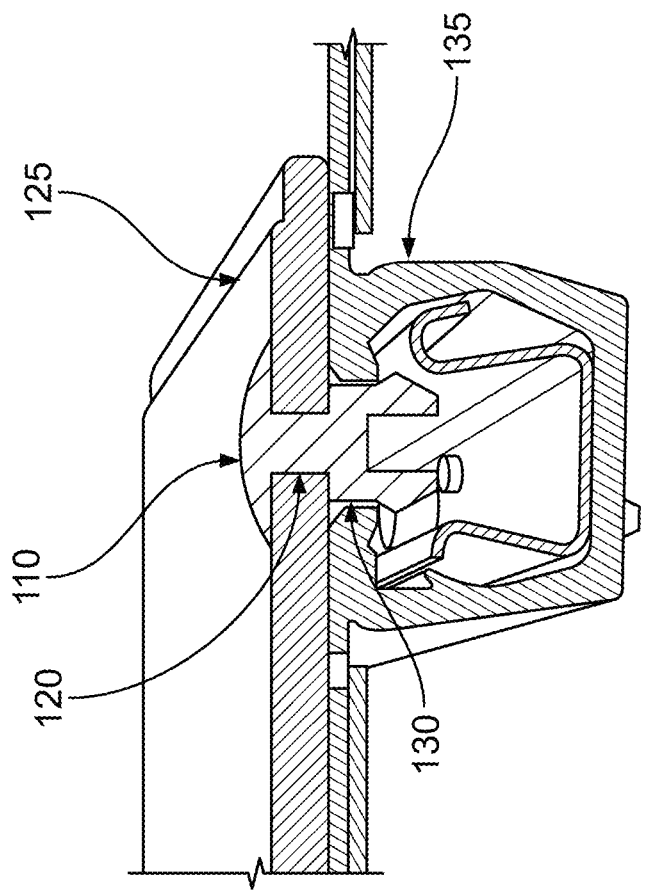
FIGS. 2A and 2B illustrate alternate embodiments of an apparatus for securing a floor mat to a seat rail, in accordance with at least one of the examples described herein.

It should be understood that the detailed description and specific examples herein while indicating exemplary embodiments, are intended for purposes of illustration only and are not intended to limit the scope of the disclosure. These and other features, aspects, and advantages of the present disclosure will become better understood from the following description, appended claims, and accompanying drawings. The figures are merely schematic and are not drawn to scale. It should also be understood that the same or similar reference numerals are used throughout the figures to indicate the same or similar parts.

As discussed briefly above, the provided prior art references generally focus on preventing a floor mat from coming loose or becoming jammed as a seat slides forwards and backwards in a seat rail, and do not touch on mat systems that can be easily removed and repositioned in the vehicle, in particular, by being attached to the seat rail. By way of summary, that will be expanded upon below, the present disclosure provides a system and apparatus that removably couples a floor mat to the track of a seat rail. In certain configurations, the mat is enabled to slide along the track of the rail when coupled to the track. The disclosure is also relevant for cargo rails as well as seat rails, and references to seat rails should be considered to also include cargo rails. In some examples, the fastener may have multiple locking positions, e.g., a first locking position in which the mat is secured to the track and cannot slide along the track, and a second position where the mat is movably coupled to the track, such that it can be adjusted relative to the track/seat, but not removed from the track, and a third position where the fastener can be completely removed from the track, as well as the floor mat.

The present disclosure now is described more fully hereinafter with reference to the accompanying drawings, in which preferred embodiments are shown. In the drawings, the thickness of lines, layers and regions may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

In known methodologies, studs complimentary to vehicle floor mats are attached to the floor of a vehicle, regardless of whether mats are chosen as optional extras by a customer at purchase or not. Typically, the mats have circular grommets which are then pushed onto these studs to be secured in place. The current system has a number of drawbacks, including, but not limited to trip issues; snagging on luggage; discomfort with bare feet; installing redundant studs to vehicles with no mats, which leads to customers being dissatisfied, thinking something is missing; and that the mats if installed, are in a fixed location and cannot be adjusted to suit sliding seat positions or different seat configurations.

FIG. 1 illustrates an apparatus 100 for securing a floor mat 125 to a seat rail 135, in accordance with at least one of the examples described herein. The apparatus 100 comprises a top plate 110, connected to a connecting portion 130 via a retaining portion 120. In some examples, the rotation of the top plate 110 is transferred to the retaining portion 130 via the connecting portion 120. As shown in FIG. 1, the top plate 110 and retaining portion 130 are configured to abut parallel surfaces of the floor mat 125, sandwiching the floor mat 125. In some examples, the retaining portion 130 is configured to fit within the aperture in the floor mat 125 with some application of force and by being manually manipulated.

As shown, in FIG. 1, in some examples, the connecting portion 120 extends through an aperture of the floor mat 125. In this way, the stud fixing currently fitted to vehicles can be completely deleted; in turn, deleting the assembly process of said studs from the manufacturing process. In addition, the top plate 310 may be formed from various types of materials including, but not limited to, polymeric materials, metals, wood, etc.

Figure 2A:
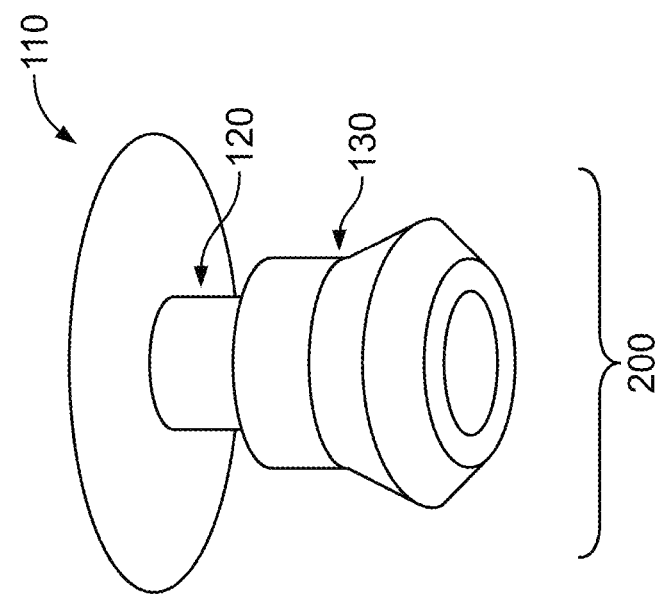

FIGS. 2A and 2B illustrate alternate embodiments of an apparatus 200 for securing a floor mat 125 to a seat rail 135, in accordance with at least one of the examples described herein. Apparatus 125 also comprises a top plate 110, a connecting portion 120, and a retaining portion 130. However, retaining portion 130 comprises a "bung" style fixing.

In this way, the bung can be pushed through the floor mat 125 and into the seat rail 135. Any such "locked" position, where apparatus 200 cannot move, is possible in this configuration, however, it is not obtained with rotation, but with pushing the apparatus further into seat rail 135.

Figure 3B:
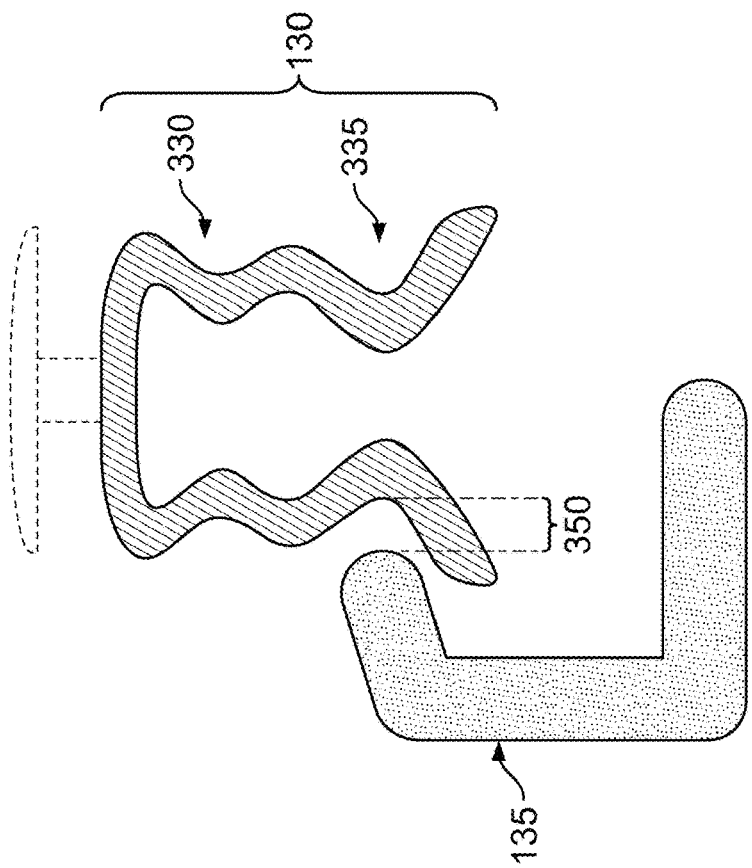
Figure 3C:
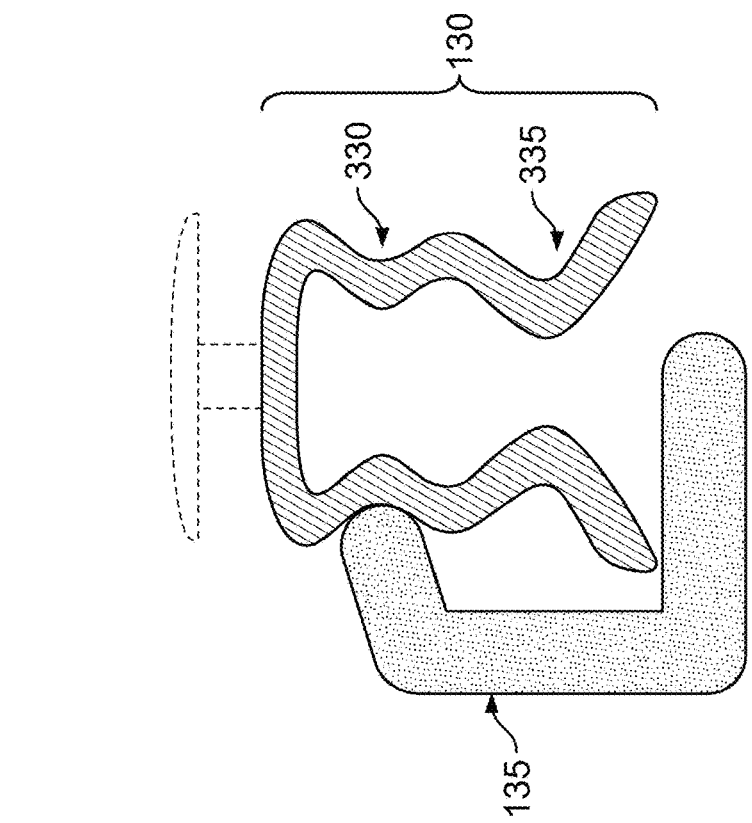

FIGS. 3A to 3C illustrate various positions of the apparatus for securing a floor mat to a seat rail, in accordance with at least one of the examples described herein. As shown in FIG. 3A, the top plate 110 may comprise instructional indicia 310 that corresponds to a positional function of top plate 110. For example, the retaining portion 130 can move freely within the seat rail when the top plate is in the first position, as shown by instructional indicia 310. In some examples, the retaining portion 130 is secured in a current position when the top plate is in a second position, as shown by instructional indicia 310. In some examples, the retaining portion 130 is removable from the seat rail 135 when the top plate is in a third position, as shown by instructional indicia 310.

In the illustrated embodiment, the top plate 110 has an upper surface that has indicia 310 thereon. There is no limitation to what the indicia 310 may be. For example, the indicia 310 may be promotional indicia such as a vehicle logo, a favorite sports team, etc.

For example, a user can rotate the top plate 110, which in turn rotates the retaining portion 130 via the connection portion 120, to different positions. The different positions correspond to a "locked" state, where the apparatus 100 cannot move in the seat rail 135; a "moveable" state, where the apparatus 100 can move within the seat rail 135; and an "unlocked" state, where the apparatus 100 is removable from the seat rail 135. In some examples, the connecting portion 120 may comprise a guided portion 320, which may assist in guiding apparatus 100 into the right position needed. However, in some examples, apparatus 100 can be moved between positions by pulling or pushing the apparatus into and out of the seat rail 135, as described below with respect to FIGS. 3B and 3C.

FIGS. 3B and 3C show a side view of another embodiment for moving the apparatus 100 in two positions. As shown, the retaining portion 130 comprises two sections that correspond to a locked state 330, and an unlocked state 335. FIG. 3B shows apparatus 100 in a "locked" position in the seat rail 135. FIG. 3C shows apparatus 100 in an "unlocked" position. In the unlocked position, the apparatus has a space 350 between the retaining portion 130 and the seat rail 135 to allow apparatus 100 to move along the seat rail. The user can move apparatus 100 between the locked and unlocked positions by pulling apparatus 100 between the two positions. In some examples, to remove apparatus 100 from seat rail 100, the user can continue to pull on apparatus 100, which is configured to have enough flex to be fully removed but only by the application of a significant amount of force.

FIG. 4 illustrates an apparatus for securing a floor mat to a seat rail, wherein the apparatus is integral to the floor mat, in accordance with at least one of the examples described herein. In particular, in FIG. 4, apparatus 410 is integral to floor mat 125. Thereafter, apparatus 410 can be pushed into a seat rail 135 (not shown).

Figure 5:
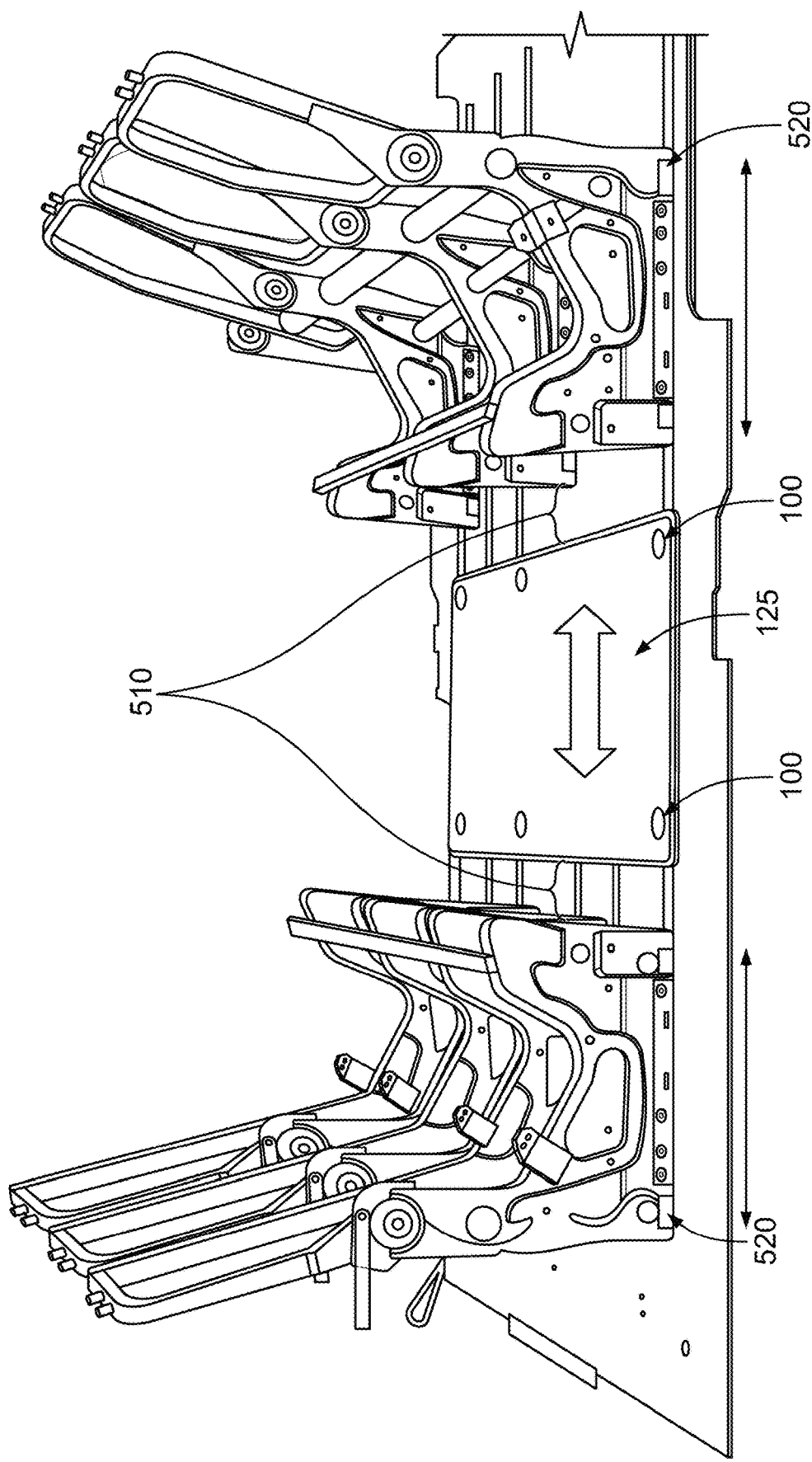
FIG. 5 illustrates a perspective view of a seat and floor mat arrangement in a vehicle, in accordance with at least one of the examples described herein.

FIG. 5 illustrates a perspective view of a seat and floor mat arrangement in a vehicle, in accordance with at least one of the examples described herein. As shown in FIG. 5, the floor mat 125, comprises a plurality of apparatus 100 for securing the floor mat 125 to the seat rails 135 of the vehicle. In particular, FIG. 5 shows that an equal spacing 510 between the two rows of seats 520 can be achieved. Furthermore, FIG. 5 shows that not only can seats 520 move but also floor mat 125 can move. Allowing the arrangement of seats 520 and the floor mat 125 to be configurable such that an even space 510 can always be obtained, and the floor mat 125 won't obstruct the seats 520.

Figure 6:
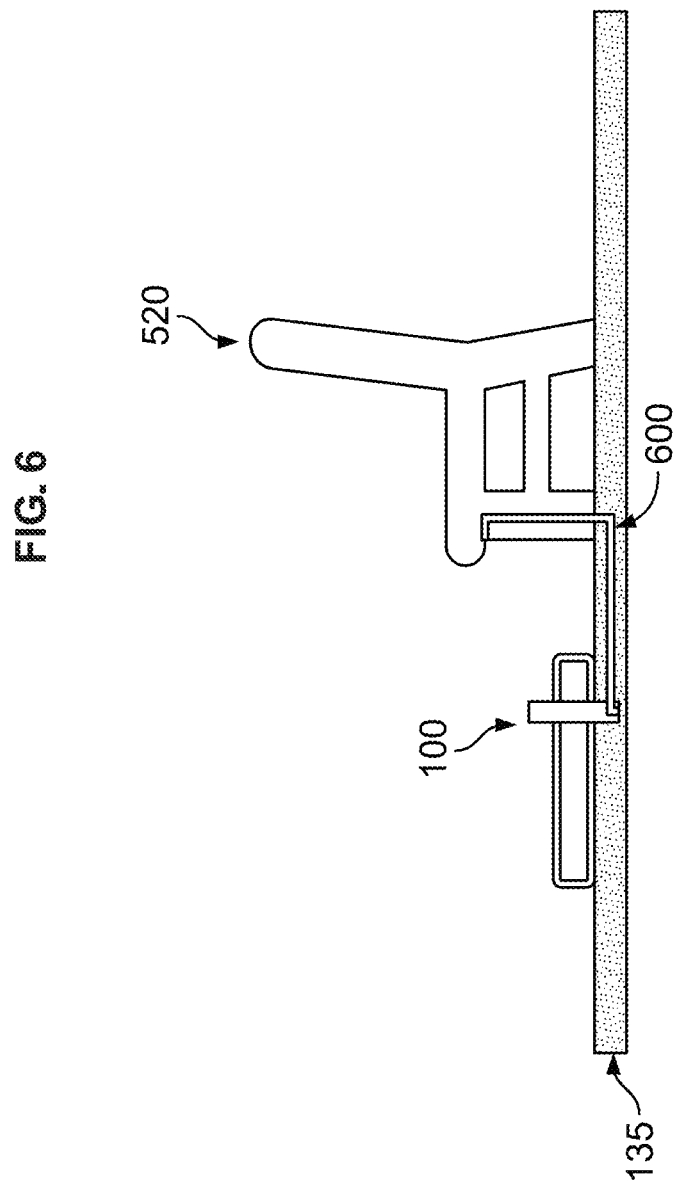
FIG. 6 illustrates a side view of a seat and floor mat arrangement in a vehicle, in accordance with at least one of the examples described herein.

FIG. 6 illustrates a side view of a seat 520 and floor mat system in a vehicle (not shown), in accordance with at least one of the examples described herein. The floor mat system comprises a floor mat 125 comprising at least one attachment portion. The attachment portion may be an aperture within the floor mat 125. The floor mat system may also comprise a fastener, such as apparatus 100, 200, 410 of FIGS. 1 to 5. The seat rail 135 may comprise a track. However, in some examples, seat rail 135 may not comprise a track and just a rail. In some examples, the fastener 100 is slidable along the seat rail while in a first position. In some examples, the fastener is fixed in a current position while in a second position. In some examples, the fastener is removable while in a third position.

As shown in FIG. 6, the floor mat system may comprise a second fastener 600 for fastening the floor mat 125 to seat 520. The second fastener 600 may be routed through seat rail 135. As seat 520 is also secured to seat rail 135 and floor mat 125, seat 520 and floor mat 125 move synchronously.

FIG. 7 illustrates a side view of a vehicle comprising a seat and floor mat arrangement, in accordance with at least one of the examples described herein. FIG. 7 illustrates a vehicle 700 comprising a floor mat system, in accordance with at least one of the examples described herein. The apparatus and systems described above with respect to FIGS. 1 to 6 may be implemented in vehicle 700. However, the present disclosure is not limited to the set-up shown in FIG. 7. For example, the floormats 125, seats 520, and seat rail 135 may be any appropriate type of configuration, such as conference seating, or any other appropriate type of seating for a vehicle, commercial or otherwise. In another example, vehicle 700 may only comprise two seats in the front and no rear seats at all. Furthermore, seat rail 135 may be configured to receive the apparatus (fastener) 100. In some examples, the front floor mat system (the devices designated with the suffix A) is independent of the rear floor mat system (the devices designated with the suffix B). In some examples, the front floor mat system may comprise the second fastener 600, but the rear floor may system may not comprise the second fastener 600. The rear floor mat system shows a plurality of fasteners 100B used to secure the rear floor mat 125B FIG. 8 illustrates an example flow chart of a method of assembly of a floor mat system, in accordance with at least one of the examples described herein. Process 800 starts at step 810, a floor mat comprising at least one attachment portion is provided. At step 820, a seat rail comprising a track is provided. At step 830, a fastener configured to removably secure the attachment portion of the floor mat to the track is provided.

FIG. 9 illustrates an example flow chart of a method of manufacture of an apparatus, in accordance with at least one of the examples described herein. Process 900 starts at step 910, a top plate configured to overlay a portion of a floor mat is provided. At step 920, a retaining portion configured to removably secure the apparatus to a seat rail is provided. At step 930, a connecting portion that connects the top plate to the retaining portion is provided.

It should be understood that the examples described above are not mutually exclusive with any of the other examples described with reference to FIGS. 1-9. The order of the description of any examples is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Other variations to the disclosed embodiments can be understood and effected by those skilled in the art of practising the claimed disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

This disclosure is made to illustrate the general principles of the systems and processes discussed above and is intended to be illustrative rather than limiting. More generally, the above disclosure is meant to be exemplary and not limiting and the scope of the disclosure is best determined by reference to the appended claims. In other words, only the claims that follow are meant to set bounds as to what the present disclosure includes.

While the present disclosure is described with reference to particular example applications, it shall be appreciated that the disclosure is not limited thereto. It will be apparent to those skilled in the art that various modifications and improvements may be made without departing from the scope and spirit of the present disclosure. Those skilled in the art would appreciate that the actions of the processes discussed herein may be omitted, modified, combined, and/or rearranged, and any additional actions may be performed without departing from the scope of the disclosure.

Any system feature as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some, and/or all features in one aspect can be applied to any, some, and/or all features in any other aspect, in any appropriate combination. It should also be appreciated that particular combinations of the various features described and defined in any aspect can be implemented and/or supplied and/or used independently.

The invention claimed is:

1. A floor mat system comprising:
   a floor mat comprising at least one attachment portion;
   a seat rail comprising a track; and
   a fastener configured to removably secure the at least one attachment portion of the floor mat to the track, wherein the fastener is slidable along the seat rail while in a first position.

2. The system of claim 1, wherein the at least one attachment portion comprises an aperture configured to receive the fastener.

3. The system of claim 1, wherein the fastener is fixed in a current position while in a second position.

4. The system of claim 1, wherein the fastener is removable while in a third position.

5. The system of claim 1, further comprising a second fastener for fastening the floor mat to a seat.

6. The system of claim 5, wherein the seat is secured to the seat rail.

7. The system of claim 6, wherein the floor mat and the seat move synchronously.

8. The system of claim 1, wherein the fastener is integral to the floor mat.

9. A vehicle comprising the floor mat system of claim 1.

10. An apparatus for securing a floor mat to a seat rail, comprising:
    a top plate that overlies a portion of the floor mat;
    a retaining portion configured to removably secure the apparatus to the seat rail; and
    a connecting portion that connects the top plate to the retaining portion, wherein the retaining portion can move freely within the seat rail when the top plate is in a first position.

11. The apparatus of claim 10, wherein the retaining portion is secured in a current position when the top plate is in a second position.

12. The apparatus of claim 10, wherein the retaining portion is removable from the seat rail when the top plate is in a third position.

13. The apparatus of claim 10, wherein rotation of the top plate is transferred to the retaining portion via the connecting portion.

14. The apparatus of claim 10, wherein the top plate and retaining portion are configured to abut parallel surfaces of the floor mat.

15. The apparatus of claim 10, wherein the connecting portion extends through an aperture of the floor mat.

16. The apparatus of claim 10, wherein the top plate comprises instructional indicia that correspond to a positional function of top plate.

17. A floor mat system comprising:
    a floor mat comprising at least one attachment portion;
    a seat rail comprising a track;
    a fastener configured to removably secure the at least one attachment portion of the floor mat to the track; and
    a second fastener for fastening the floor mat to a seat, wherein the seat is secured to the seat rail, and wherein the floor mat and the seat move synchronously.

* * * * *